US006405777B1

(12) United States Patent
Lebbad

(10) Patent No.: US 6,405,777 B1
(45) Date of Patent: Jun. 18, 2002

(54) OPTICAL DISC LABELING METHOD USING A COMPACT CYLINDRICAL CAP LABELING DEVICE

(76) Inventor: Mounir Jabra Lebbad, P.O. Box 443, N. Hollywood, CA (US) 91603

( * ) Notice: Subject to any disclaimer, the term of this patent is extended or adjusted under 35 U.S.C. 154(b) by 0 days.

(21) Appl. No.: 09/715,396

(22) Filed: Nov. 18, 2000

(51) Int. Cl.[7] .......................... B32B 31/00; B65C 1/00

(52) U.S. Cl. ....................... 156/391; 156/556; 156/514; 156/580

(58) Field of Search ................................ 156/391, 556, 156/579, 580, 514, 574

(56) References Cited

U.S. PATENT DOCUMENTS

| | | | | |
|---|---|---|---|---|
| 5,375,515 A | * | 12/1994 | Morgan | 101/4 |
| 5,435,246 A | * | 7/1995 | Edman | 101/333 |
| 5,783,031 A | * | 7/1998 | Sievers | 156/556 |
| 5,902,446 A | | 5/1999 | Casillo | |
| 5,925,200 A | | 7/1999 | Grossman | |
| 5,951,819 A | | 9/1999 | Hummell | |
| 5,958,177 A | | 9/1999 | Claussnitzer | |
| 6,302,176 B1 | * | 10/2001 | Chen | 156/391 |

* cited by examiner

*Primary Examiner*—Richard Crispino
*Assistant Examiner*—Sue A. Purvis

(57) ABSTRACT

A compact cylindrical cap labeling device for applying self adhesive labels onto optical discs is disclosed, embodying a one piece cylindrical-body construction that can be manufactured from a rigid material at a nominal cost, comprising a hollow cylindrical wall having a diameter approximately equal to the central aperture of an optical disc label, a chamfered cornice edge specifically designed to assist the operator to manually guide a label central aperture around the hollow cylindrical wall in order to affix the label onto the optical disc, and a center post protruding perpendicularly and concentrically from its undersurface engages through the optical disc central aperture while the optical disc is positioned and retained into its jewel case, to interlock frictionally into the optical disc jewel case retainer ring, whereby resulting in a concentrically fixed and stationary position of the compact cylindrical cap labeling device over the optical disc surface, thus providing a precise and accurate method for affixing self adhesive labels onto optical discs with superior results, and substantially eliminates the opportunity for operator error.

12 Claims, 4 Drawing Sheets

OPTICAL DISC LABELING METHOD USING A COMPACT CYLINDRICAL CAP LABELING DEVICE

BACKGROUND

1. Field of the Invention

This invention relates generally to the field of labelers and labeling methods, specifically to a labeler and a method for concentrically aligning and affixing labels onto optical discs 2. Description of Prior Art In recent years, recordable optical discs have grown in popularity, and computer users have had the option of using a storage medium known as writable compact disc-drive capable of writing data and storing digital information on a blank recordable optical disc; thereby, the consumer is faced with the complexity of labeling the disc for future reference while exercising care in affixing and aligning the label concentrically onto the disc in such a way that the overall balance of the disc is not adversely affected. In particular, it is necessary that the center of balance of the disc remains about its geometric center to ensure its high speed rotational balance about its axis into its compact disc-drive case. Labels which are not concentrically affixed to the disc have previously caused malfunctions and often rendered the disc virtually useless.

This problem has been partially solved by the prior art labeling devices, identified in the accompanying information disclosure statement, which attempt to make the placement and affixing of self adhesive labels onto optical discs simpler for the consumer. In using these devices, the operator must initially position an adhesive label with the adhesive side facing upwards, this step alone can be difficult because of the tendency of the label to stick to the operator's fingers when the operator attempts to withdraw his/her fingers in order for the optical disc to be pressed onto the label, also, there is a tendency for the label to curl upwards when the operator is not holding the label down. Further care has to be taken to ensure that no air bubbles are trapped between the label and the disc after the disc is pressed onto the label, such air bubbles are not only unsightly, but may also cause balancing problems in the optical disc compact disc-drive case. It will be appreciated that these known devices therefore relies upon the manual skill of the operator in order to achieve acceptable results; whereas these devices have the drawback of being both more complicated to use, and prohibitively expensive to manufacture.

Accordingly, it is an object of the present invention to provide a device that is compact and efficient to overcome the aforementioned problems, whereas the present invention, a compact cylindrical cap labeling device is designed specifically with the intent to meet these requirements thus providing ease of use, accuracy, and concentrical alignment in affixing the label onto the optical disc without any resulting air bubbles, and substantially eliminates the opportunity for operator error, and hence flexibility of manufacturing from a rigid material at a nominal cost.

BRIEF SUMMARY OF THE INVENTION

In accordance with the present invention, a compact cylindrical cap labeling device for affixing self adhesive labels onto optical discs, embodying a one piece cylindrical-body construction that can be manufactured from a rigid material at a nominal cost, comprising a hollow cylindrical wall, a chamfered cornice edge, and a center post protruding perpendicularly from its undersurface and substantially in the middle of said hollow cylindrical wall.

BRIEF DESCRIPTION OF THE SEVERAL VIEWS OF THE DRAWING

The invention is additionally explained using exemplifying embodiments depicted in the drawing. In the drawing.

REFERENCE NUMERALS IN DRAWINGS

Numerals: 10, 11, 12, 13, 14, 15 refer to the elements in FIGS. 1, 2, 3, and 4 of the compact cylindrical cap labeling device:

10 Compact cylindrical cap labeling device.

11 Chamfered cornice edge.

12 Hollow cylindrical wall.

13 Hollow cylindrical wall flat bottom edge.

14 Undersurface.

15 Center post.

Figure 5:
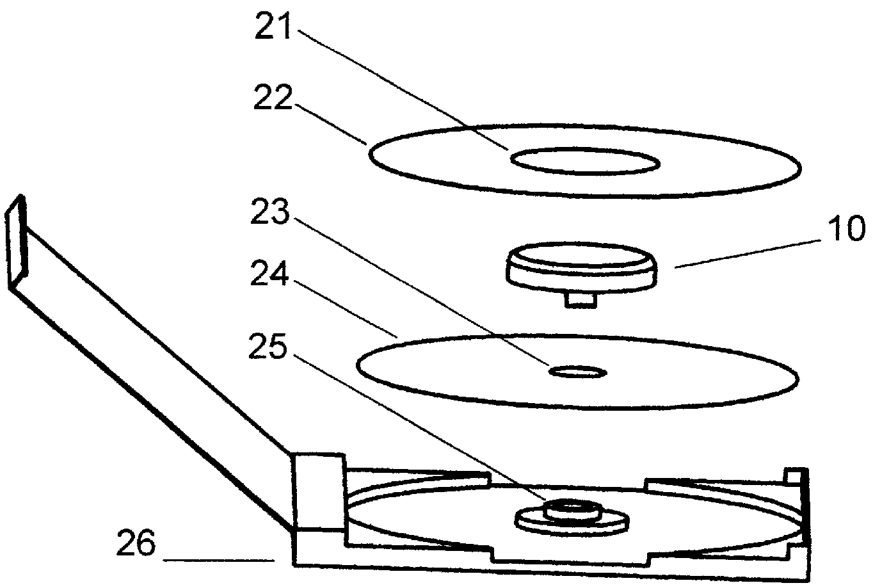
FIG. 5 is a perspective exploded view showing the initial stage of the process in the order in which the invention of FIG. 1 is used.
Figure 6:
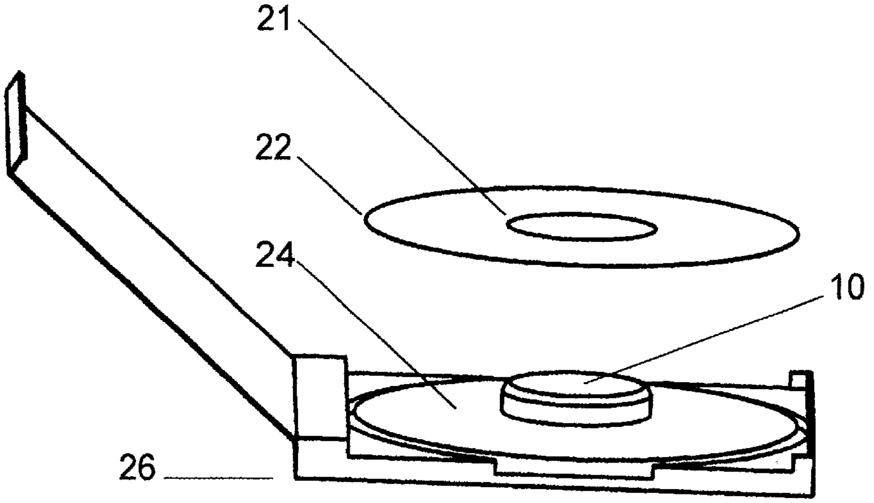
FIG. 6 is a perspective exploded view showing the process in the order in which the invention of FIG. 1 is used, with the label in position to be placed onto the optical disc
Figure 7:
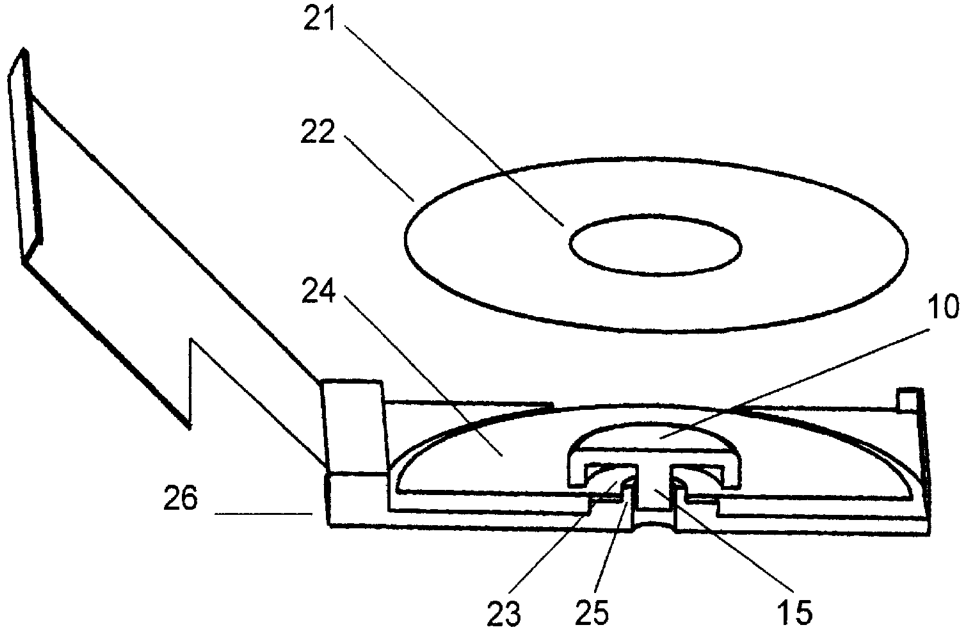
FIG. 7 is a partial cross section view of FIG. 6.

Numerals: 21, 22, 23, 24, 25, 26 refer to the elements in FIGS. 5, 6, and 7 showing the process in the order in which the invention is used:

21 Label central aperture.

22 Label.

23 Optical disc central aperture.

24 Optical disc.

25 Optical disc jewel case retainer ring.

26 Optical disc jewel case.

DETAILED DESCRIPTION OF THE INVENTION

The preferred embodiments of the compact cylindrical cap labeling device will now be described using exemplifying embodiments depicted in the figures. For the purpose of clarity in the following description, any reference numeral representing an element in one figure shall represent the same element in any other figure.

Figure 1:
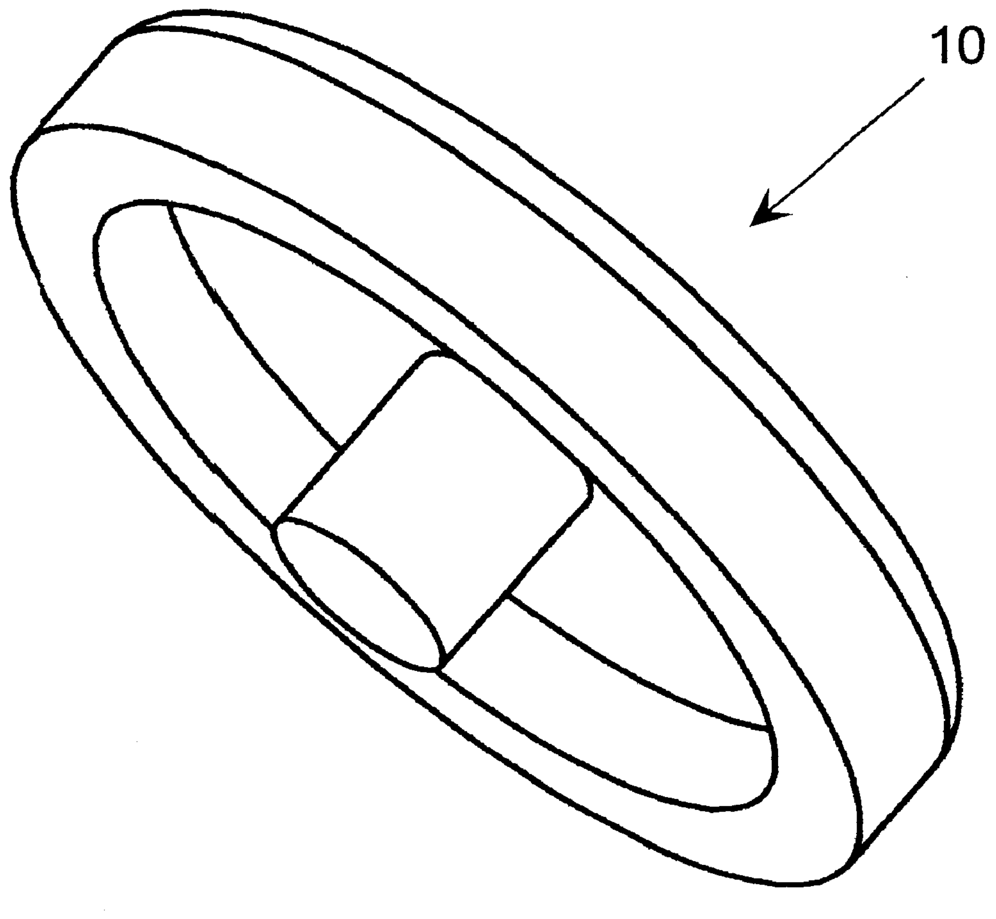
FIG. 1 is a perspective view of the one piece cylindrical-body construction of a compact cylindrical cap labeling device.

Referring now to the Figures:

FIG. 1 illustrates a perspective view of the one piece cylindrical-body construction of a compact cylindrical cap labeling device 10, which can be manufactured at a nominal cost from a rigid material such as plastic, glass, fiber glass, etc. . . .

Figure 2:
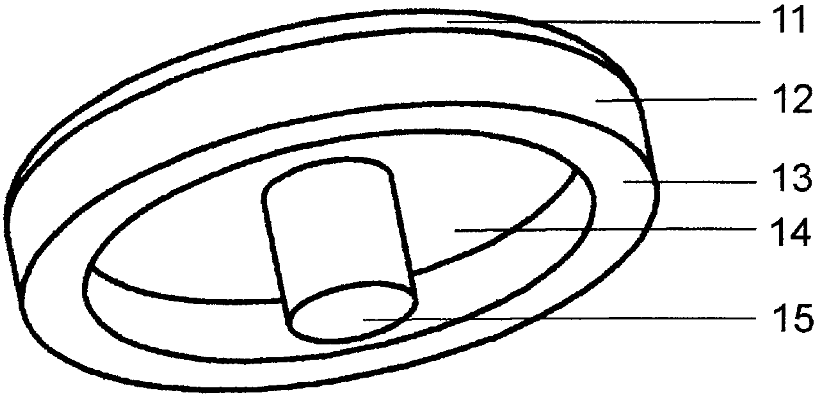
FIG. 2 is a detailed perspective view of the labeling device in FIG. 1

FIG. 2 illustrates a detailed perspective view of the compact cylindrical cap labeling device of FIG. 1, showing a chamfered cornice edge 11 specifically designed to assist the user to manually guide a label central aperture around a hollow cylindrical wall 12 in order to position a self adhesive label concentrically onto an optical disc. The hollow cylindrical wall 12 has a flat bottom edge 13 which is perpendicular to a center post 15 for preventing misalignment of relative surface placement of the compact cylindrical cap labeling device when placed over the optical disc surface. The center post 15 is protruding perpendicularly from a undersurface 14 and substantially in the middle of the hollow cylindrical wall 12.

Figure 3:
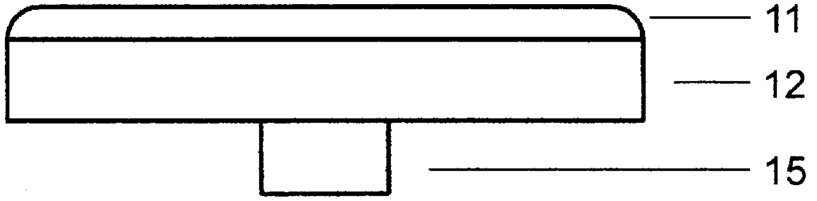
FIG. 3 is a side view of the labeling device in FIG. 1.

FIG. 3 illustrates a side view of the compact cylindrical cap labeling device of FIG. 1, showing the chamfered cornice edge 11, the hollow cylindrical wall 12, and the center post 15 protruding perpendicularly from the undersurface of the compact cylindrical cap labeling device.

Figure 4:
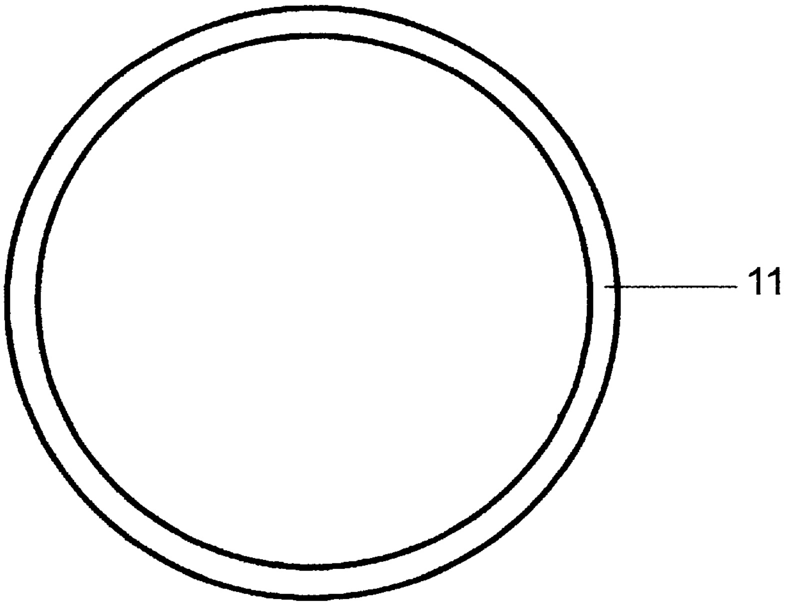
FIG. 4 is a top plan view of the labeling device in FIG. 1.

FIG. 4 illustrates a top plan view of the compact cylindrical labeling device of FIG. 1, showing a top plan view of the chamfered cornice edge 11.

FIG. 5 illustrates a perspective exploded view of the initial stage of the process, in the order in which the compact cylindrical cap labeling device of FIG. 1 is used, whereas the compact cylindrical cap labeling device 10 is depicted in this view in concentric alignment under a label central aperture 21 of a label 22 and directly above a optical disc central aperture 23 of a optical disc 24 which is positioned directly above a retainer ring 25 of a optical disc jewel case 26. It should be noted at this point, that the optical disc jewel case 26 is a protective housing that is available as an integral part of the optical disc packaging by the manufacturer of the optical disc.

FIG. 6 illustrates a perspective exploded view of the manner of using the compact cylindrical cap labeling device of FIG. 1, whereas the compact cylindrical cap labeling device 10 is placed over the optical disc 24 that is retained into its optical disc jewel case 26, and the label central aperture 21 of the label 22 which is positioned in concentric alignment directly above the compact cylindrical cap labeling device 10 to be manually affixed onto the optical disc 24.

FIG. 7 illustrates a partial cross section view of FIG. 6, wherein the compact cylindrical cap labeling device 10 is placed over the optical disc 24 which is retained and supported into its optical disc jewel case 26 by the optical disc jewel case retainer ring 25; the center post 15 is detachably engaged through the optical disc central aperture 23 into the optical disc jewel case retainer ring 25 thus preventing lateral displacement of the compact cylindrical cap labeling device 10 along the surface of the optical disc 24 and providing a fixed and stationary position of the compact cylindrical cap labeling device 10 onto the optical disc 24 so the user can manually guide the label central aperture 21 of the label 22 over the compact cylindrical cap device 10 and concentrically affix the label 22 onto the optical disc 24.

From the exemplified description above the reader can see the ease in the manner of using the compact cylindrical cap labeling device 10, in that, once the optical disc 24 is positioned and retained into its optical disc jewel case 26, the compact cylindrical cap labeling device 10 is placed onto the optical disc 24 by engaging the center post 15 through the optical disc central aperture 23 into the optical disc jewel case retainer ring 25 for a fixed and stationary position of the compact cylindrical cap labeling device 10, whereas the operator can manually guide the label central aperture 21 over the compact cylindrical cap labeling device 10 and affix the label 22 onto the optical disc 24 with superior results of accuracy in concentric alignment of the label 22 onto the optical disc 24 and without any resulting air bubbles being trapped in between the two adjoining surfaces of the label 22 and the optical disc 24.

Accordingly the reader will see that the compact cylindrical cap labeling device can be used with ease, convenience, precision, and accuracy to affix self adhesive labels concentrically onto optical discs without resulting air bubbles being trapped between the two adjoining surfaces of the label and the optical disc, and substantially eliminates the opportunity for operator error, and hence the flexibility of manufacturing at a nominal cost from a rigid material such as plastic, glass, fiberglass, etc. . . .

Furthermore, the compact cylindrical cap labeling device has the additional advantages in that it can be manufactured in a variety of colors, it is light in weight, and hence it provides the operator a precise and accurate method for affixing self adhesive labels onto optical discs with superior results.

It is to be understood that this is merely the best mode for carrying out the invention, and that various possible modifications can be made in the manufacturing of the compact cylindrical cap labeling device to meet possible future modifications in the design specifications of the label's central aperture diameter and/or dimensional shape, and the optical disc jewel case retainer ring diameter and/or dimensional shape, wherein the overall cross section diameter and/or dimensional shape of the hollow cylindrical wall 12 can be modified to meet any possible future modifications of the label central aperture; and hence, the overall diameter and/or dimensional shape of the center post 15 can also be modified to meet any possible future modifications of the optical disc jewel case retainer ring cross section diameter and/or dimensional shape.

I claim:

1. A labeling device for applying a self adhesive label onto an optical disc comprising:

a) a compact cylindrical cap embodying a one piece cylindrical body construction having a hollow cylindrical wall and a center post substantially in the middle of said hollow cylindrical wall, b) an optical disc and an optical disc jewel case having a retainer ring, and c) where said optical disc is positioned and retained onto said optical disc jewel case retainer ring, and said labeling device is placed on top of the optical disc with said labeling device center post detachably engaging into the optical disc jewel case retainer ring.

2. The labeling device of claim 1, wherein said hollow cylindrical wall further comprises a flat bottom edge being perpendicular to said center post, said flat bottom edge being for preventing misalignment of relative surface placement of said labeling device onto said optical disc surface.

3. The labeling device of claim 1, wherein said center post is protruding from the undersurface of said labeling device, substantially in the middle of said hollow cylindrical wall and perpendicularly to said flat bottom edge of the hollow cylindrical wall.

4. The labeling device of claim 1, wherein said center post detachably engages into said retainer ring of the optical disc jewel case, whereby preventing lateral displacement of said labeling device fixed position along the surface of said optical disc.

5. The labeling device of claim 1, wherein said center post being a concentrical centering means of said labeling device position onto said optical disc when the center post is engaged into said retainer ring of said optical disc jewel case.

6. The labeling device of claim 1, wherein said hollow cylindrical wall has a chamfered cornice edge being for concentrically guiding a self adhesive label central aperture around said labeling device when said self adhesive label is being positioned over the optical disc.

7. A method for applying a self adhesive label onto an optical disc using a one piece cylindrical body construction labeling device having a hollow cylindrical wall and a center post substantially in the middle of said hollow cylindrical wall, comprising the steps of:

a) Providing a optical disc retained into an optical disc jewel case by a retainer ring of said optical disc jewel case, and b) Providing a self adhesive label with a central aperture, and c) Positioning said labeling device over said optical disc with said labeling device center post detachably engaging into said optical disc jewel case retainer ring, d) whereby the user can manually guide said self adhesive label central aperture over the labeling device and concentrically affix the self adhesive label onto the optical disc, and e) said method results in superior accuracy of concentrical alignment in affixing the self adhesive label onto the optical disc.

8. The labeling method of claim 7, wherein said hollow cylindrical wall comprises a flat bottom edge which is perpendicular to said center post, said flat bottom edge being for aligning relative surface position of said labeling device when engaged over said optical disc.

9. The labeling method of claim 7, wherein said center post is protruding perpendicularly from the undersurface of said labeling device and substantially in the middle of said hollow cylindrical wall.

10. The labeling method of claim 7, wherein said center post detachably engages into said retainer ring of said optical disc jewel case, whereby providing a fixed and stationary position of the labeling device onto the optical disc.

11. The labeling method of claim 7, wherein said center post being a centering means of said labeling device fixed and stationary position onto said optical disc.

12. The labeling method of claim 7, wherein said hollow cylindrical wall has a chamfered cornice edge, whereby a user can manually guide a self adhesive label central aperture over said chamfered cornice edge of the cylindrical wall to affix said self adhesive label onto the optical disc.

* * * * *

US006405777C1

(12) EX PARTE REEXAMINATION CERTIFICATE (5159th)

United States Patent
Lebbad

(10) Number: US 6,405,777 C1
(45) Certificate Issued: Jul. 19, 2005

(54) OPTICAL DISC LABELING METHOD USING A COMPACT CYLINDRICAL CAP LABELING DEVICE

(75) Inventor: Mounir Jabra Lebbad, P.O. Box 443, N. Hollywood, CA (US) 91603

(73) Assignee: Mounir Jabra Lebbad, North Hollywood, CA (US)

Reexamination Request:
No. 90/006,626, May 6, 2003

Reexamination Certificate for:
Patent No.: 6,405,777
Issued: Jun. 18, 2002
Appl. No.: 09/715,396
Filed: Nov. 18, 2000

(51) Int. Cl.$^{7}$ .......................... B32B 31/00; B65C 1/00
(52) U.S. Cl. ...................... 156/391; 156/556; 156/514; 156/580
(58) Field of Search ............................ 156/391, 556, 156/514, 574, 579, 580

(56) References Cited

FOREIGN PATENT DOCUMENTS

| | | | |
|---|---|---|---|
| DE | 19620629 A1 | * | 12/1997 |
| JP | 11263328 A | * | 9/1999 |
| JP | 2001093195 A | * | 4/2001 |

OTHER PUBLICATIONS

Literature & Instruction by CD Label Corp.
Design Technical Sheet by the Manufacturer of the Prior Art "General Polymer Molding".
Page–Catalog & Instruction Literature by a Vendor of the Prior Art "Label Once Corp."

* cited by examiner

*Primary Examiner*—Chris Fiorilla

(57) ABSTRACT

A compact cylindrical cap labeling device for applying self adhesive labels onto optical discs is disclosed, embodying a one piece cylindrical-body construction that can be manufactured from a rigid material at a nominal cost, comprising a hollow cylindrical wall having a diameter approximately equal to the central aperture of an optical disc label, a chamfered cornice edge specifically designed to assist the operator to manually guide a label central aperture around the hollow cylindrical wall in order to affix the label onto the optical disc, and a center post protruding perpendicularly and concentrically from its undersurface engages through the optical disc central aperture while the optical disc is positioned and retained into its jewel case, to interlock frictionally into the optical disc jewel case retainer ring, whereby resulting in a concentrically fixed and stationary position of the compact cylindrical cap labeling device over the optical disc surface, thus providing a precise and accurate method for affixing self adhesive labels onto optical discs with superior results, and substantially eliminates the opportunity for operator error.

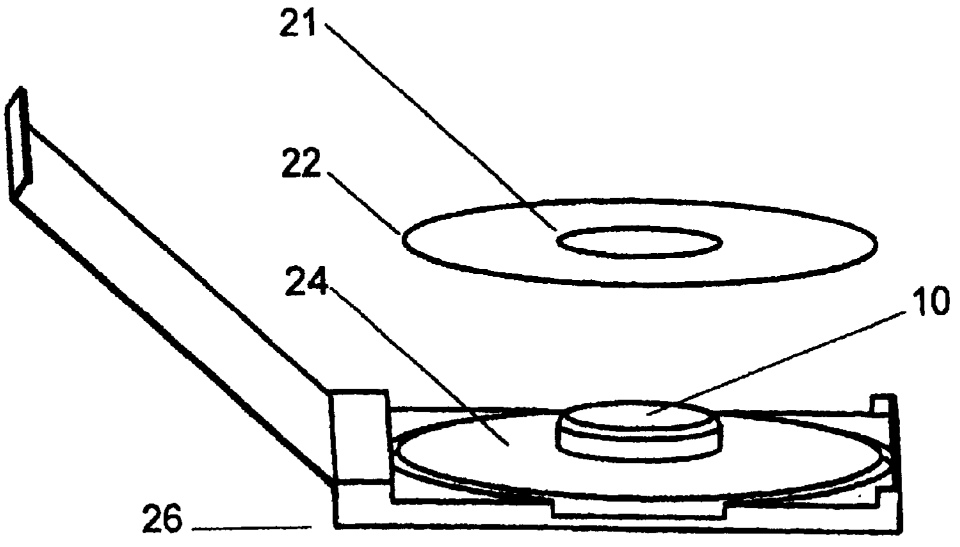

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 are cancelled.

* * * * *